(12) United States Patent
Teng

(10) Patent No.: US 12,121,813 B2
(45) Date of Patent: Oct. 22, 2024

(54) VIRTUAL ITEM INTERACTION METHOD AND APPARATUS, COMPUTER DEVICE, AND STORAGE MEDIUM

(71) Applicant: Tencent Technology (Shenzhen) Company Limited, Shenzhen (CN)

(72) Inventor: Caifeng Teng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 234 days.

(21) Appl. No.: 17/682,338

(22) Filed: Feb. 28, 2022

(65) Prior Publication Data

US 2022/0176250 A1    Jun. 9, 2022

Related U.S. Application Data

(63) Continuation of application No. PCT/CN2020/128296, filed on Nov. 12, 2020.

(30) Foreign Application Priority Data

Feb. 12, 2020  (CN) .......................... 202010088841.8

(51) Int. Cl.
   *A63F 13/577*  (2014.01)
   *A63F 13/56*   (2014.01)
   *G06F 3/04815* (2022.01)

(52) U.S. Cl.
   CPC ............ *A63F 13/577* (2014.09); *A63F 13/56* (2014.09); *G06F 3/04815* (2013.01); *A63F 2300/643* (2013.01)

(58) Field of Classification Search
   CPC .. A63F 13/56; A63F 13/577; A63F 2300/643; G06F 3/04815
   See application file for complete search history.

(56) References Cited

U.S. PATENT DOCUMENTS 4,521,014 A  *  6/1985  Sitrick .................... A63F 13/63
                                                      463/31
4,710,873 A  * 12/1987  Breslow ................. A63F 13/00
                                                      463/31
(Continued)

FOREIGN PATENT DOCUMENTS

CN         106055108 A         10/2016
CN         106445159 A          2/2017
(Continued)

OTHER PUBLICATIONS

Cenk Kanlioglu, Car Racing, May 16, 2014, youtube.com, pp. 1-4, at https://www.youtube.com/watch?v=7ElwKMNsDGY (last visited Dec. 14, 2023). (Year: 2014).*
(Continued)

*Primary Examiner* — Steve Rowland
(74) *Attorney, Agent, or Firm* — Crowell & Moring LLP

(57) ABSTRACT

A virtual item interaction method and apparatus, a computer device, and a storage medium are provided. The method includes: displaying a virtual element and an image captured by using an interactive interface, the virtual element overlapping a reference body part of a target object in the image; displaying an animation of at least one virtual item; and in response to any of the at least one virtual item touching the virtual element, capturing the any of the at least one virtual item.

20 Claims, 6 Drawing Sheets

(56) References Cited

U.S. PATENT DOCUMENTS

| | | | |
|---|---|---|---|
| 9,348,488 B1* | 5/2016 | Renema, II | G06F 3/04817 |
| 9,952,755 B2* | 4/2018 | Ogiso | G06F 3/04845 |
| 10,603,589 B2* | 3/2020 | Miyamoto | A63F 13/56 |
| 10,953,334 B2* | 3/2021 | Kolen | G06N 3/047 |
| 2009/0044113 A1* | 2/2009 | Jones | G06T 13/40 |
| | | | 715/707 |
| 2009/0215533 A1* | 8/2009 | Zalewski | H04N 21/4755 |
| | | | 463/32 |
| 2010/0045667 A1* | 2/2010 | Kornmann | G06T 19/003 |
| | | | 345/158 |
| 2012/0309520 A1* | 12/2012 | Evertt | A63F 13/213 |
| | | | 463/31 |
| 2015/0258430 A1* | 9/2015 | Alexeev | G06F 3/04883 |
| | | | 463/36 |
| 2018/0024660 A1* | 1/2018 | Wang | G06F 3/04817 |
| | | | 273/110 |
| 2018/0164801 A1* | 6/2018 | Kim | G05D 1/0033 |
| 2019/0046878 A1* | 2/2019 | Howard | A63F 13/426 |
| 2019/0126148 A1* | 5/2019 | Wei | A63F 13/2145 |
| 2021/0339151 A1* | 11/2021 | Stafford | A63F 13/213 |
| 2021/0379491 A1* | 12/2021 | Liu | A63F 13/426 |
| 2023/0078466 A1* | 3/2023 | Lu | A63F 13/837 |
| | | | 463/2 |
| 2023/0350019 A1* | 11/2023 | Emadi | G01S 13/931 |

FOREIGN PATENT DOCUMENTS

| | | |
|---|---|---|
| CN | 108958475 A | 12/2018 |
| CN | 108985733 A | 12/2018 |
| CN | 109407825 A | 3/2019 |
| CN | 110738804 A | 1/2020 |
| CN | 111324253 A | 6/2020 |

OTHER PUBLICATIONS

International Search Report and Written Opinion for International Patent Application No. PCT/CN2020/128296 dated Feb. 19, 2021, 12 pgs.

Chinese Office Action for Chinese Patent Application No. 202010088841.8 dated Dec. 4, 2020, 13 pgs.

MT_Technologies, "Grab Red Envelope Kinect Game", Youku.com, Mar. 12, 2015 pp. 1-3, Figs 1-4.

* cited by examiner

VIRTUAL ITEM INTERACTION METHOD AND APPARATUS, COMPUTER DEVICE, AND STORAGE MEDIUM

RELATED APPLICATION

This application is a continuation application of PCT Patent Application No. PCT/CN2020/128296, filed on Nov. 12, 2020, which claims priority to Chinese Patent Application No. 202010088841.8, filed with the National Intellectual Property Administration, PRC on Feb. 12, 2020, both of which are incorporated herein by reference in their entireties.

FIELD OF THE TECHNOLOGY

This application relates to the field of computer application technologies, and in particular, to a virtual item interaction method and apparatus, a computer device, and a storage medium.

BACKGROUND OF THE DISCLOSURE

With the development of computer technologies and an increasing demand for man-machine interaction, a plurality of interaction manners have emerged one after another, such as grabbing red packets and liking videos, adding a lot of fun to people's daily lives.

The related art provides an interaction manner, in which the user acquires, by clicking on a screen, a corresponding virtual item according to the quantity of clicks. Because a click action performed by the user is single and rigid, the user is prone to feel bored about it. As a result, such an interaction manner is not attractive to the user.

SUMMARY

Embodiments of this disclosure provide a virtual item interaction method and apparatus, a computer device, and a storage medium, which can increase the attractiveness to the user and enhance the interaction. The technical solutions are as follows:

According to one aspect, a virtual item interaction method is provided, the method including:

displaying a virtual element and a captured image through an interactive interface, the virtual element overlapping a reference body part of a target object in the image;

displaying a movement animation of at least one virtual item; and in response to any virtual item meeting the virtual element, acquiring the any virtual item.

Optionally, the displaying a virtual element and a captured image by using an interactive interface includes:

displaying the captured image by using the interactive interface; and displaying the virtual element based on a position of the reference body part in the interactive interface.

Optionally, after the displaying a virtual element and a captured image by using an interactive interface, the method further includes:

in response to a change in the position of the reference body part in the interactive interface, displaying the virtual element based on the changed position of the reference body part, so that the virtual element and the reference body part keep overlapping.

Optionally, the displaying a movement animation of at least one virtual item includes:

displaying animations of a plurality of virtual items moving in a target direction.

Optionally, a distance between any two adjacent virtual items in the target direction in the plurality of virtual items is a target distance; or, an interval between display time periods of any two adjacent virtual items in the plurality of virtual items is a target duration.

Optionally, the displaying animations of a plurality of virtual items moving in a target direction includes:

acquiring a distance between any two adjacent virtual items in the target direction in the plurality of virtual items; and displaying the animations of the plurality of virtual items moving in the target direction based on the acquired distance.

Optionally, the acquiring a distance between any two adjacent virtual items in the target direction in the plurality of virtual items includes:

acquiring a random value based on a target value range for the any two virtual items; and determining a product of an initial distance and the random value as the distance between the any two virtual items in the target direction.

Optionally, the displaying animations of a plurality of virtual items moving in a target direction includes:

displaying animations of the plurality of virtual items respectively moving in a plurality of channels, a direction of the plurality of channels being the target direction; or, displaying animations of the plurality of virtual items respectively moving along a plurality of baselines, a direction of the plurality of baselines being the target direction.

Optionally, the displaying animations of the plurality of virtual items respectively moving in a plurality of channels includes:

determining the plurality of channels in the interactive interface; and for any one of the plurality of virtual items, randomly determining any channel from the plurality of channels, and displaying an animation of the any virtual item moving in the any channel.

Optionally, the determining the plurality of channels in the interactive interface includes:

dividing the interactive interface into the plurality of channels based on a width of the interactive interface, a width of each channel being greater than a width of the virtual item.

Optionally, the displaying animations of the plurality of virtual items respectively moving along a plurality of baselines includes:

determining the plurality of baselines in the interactive interface; and for any one of the plurality of virtual items, randomly determining any baseline from the plurality of baselines, and displaying an animation of the any virtual item moving along the any baseline.

Optionally, the virtual item is a virtual resource packet, and at least one virtual resource packet includes a virtual resource; the in response to any virtual item meeting the virtual element, acquiring the any virtual item includes:

in response to any virtual resource packet meeting the virtual element, delivering a virtual resource in the virtual resource packet to a resource account of a user identification currently logged in.

Optionally, the determining the plurality of baselines in the interactive interface includes:
determining the plurality of baselines in the interactive interface based on a width of the interactive interface, a width between any two adjacent baselines in the plurality of baselines being greater than a width of the virtual item.

Optionally, the method further includes:
in response to any virtual item moving to a boundary line in the interactive interface in the target direction, removing the any virtual item from the interactive interface.

Optionally, the displaying a movement animation of at least one virtual item includes:
acquiring a movement rate of the at least one virtual item; and
displaying an animation of the at least one virtual item moving at the corresponding movement rate.

Optionally, the displaying a movement animation of at least one virtual item includes:
displaying movement animations of a plurality of virtual items in a plurality of display periods.

Optionally, the displaying movement animations of a plurality of virtual items in a plurality of display periods includes:
acquiring movement rates respectively corresponding to the display periods, the movement rates of the plurality of display periods increasing progressively; and
displaying the animations of the plurality of virtual items moving at the corresponding movement rate in each of the display periods.

Optionally, the acquiring movement rates respectively corresponding to the display periods includes:
determining a product of a sequence number of each display period in the plurality of display periods and an initial rate as the movement rate corresponding to the each display period.

Optionally, the in response to any virtual item meeting the virtual element, acquiring the any virtual item includes:
in response to a distance between the any virtual item and the virtual element being less than a distance threshold, determining that the any virtual item meets the virtual element, and acquiring the any virtual item.

Optionally, the in response to any virtual item meeting the virtual element, acquiring the any virtual item includes:
in response to the any virtual item meeting the virtual element, acquiring the any virtual item, and removing the any virtual item from the interactive interface.

Optionally, the method further includes:
displaying a total quantity of acquired virtual items in the interactive interface.

Optionally, the in response to the any virtual item meeting the virtual element, acquiring the any virtual item includes:
acquiring the any the virtual items in a case that it is determined, by using a first application, that the any virtual item meets the virtual element, and transmitting a contact notification message to a second application, the contact notification message carrying an identifier of the any virtual item; and
receiving the contact notification message by using the second application, removing the any virtual item from the interactive interface based on the identifier of the any virtual item, and updating the total quantity of acquired virtual items.

According to another aspect, a virtual item interaction apparatus is provided, including:

a display module, configured to display a virtual element and a captured image by using an interactive interface, the virtual element overlapping a reference body part of a target object in the image,
the display module being further configured to display a movement animation of at least one virtual item; and
an item acquisition module, configured to acquire, in response to any virtual item meeting the virtual element, the any virtual item.

Optionally, the display module includes:
a first display unit, configured to display the captured image by using the interactive interface; and
a second display unit, configured to display the virtual element based on a position of the reference body part in the interactive interface.

Optionally, the display module is further configured to display, in response to a change in the position of the reference body part in the interactive interface, the virtual element based on the changed position of the reference body part, so that the virtual element and the reference body part keep overlapping.

Optionally, the display module includes:
a third display unit, configured to display animations of a plurality of virtual items moving in a target direction.

Optionally, a distance between any two adjacent virtual items in the target direction in the plurality of virtual items is a target distance; or,
an interval between display time periods of any two adjacent virtual items in the plurality of virtual items is a target duration.

Optionally, the third display unit is configured to acquire a distance between any two adjacent virtual items in the target direction in the plurality of virtual items; and display the animations of the plurality of virtual items moving in the target direction based on the acquired distance.

Optionally, the third display unit is further configured to acquire a random value based on a target value range for the any two virtual items; and determine a product of an initial distance and the random value as the distance between the any two virtual items in the target direction.

Optionally, the third display unit is further configured to:
display animations of the plurality of virtual items respectively moving in a plurality of channels, a direction of the plurality of channels being the target direction; or,
display animations of the plurality of virtual items respectively moving along a plurality of baselines, a direction of the plurality of baselines being the target direction.

Optionally, the third display unit is further configured to determine the plurality of channels in the interactive interface; and for any one of the plurality of virtual items, randomly determine any channel from the plurality of channels, and display an animation of the any virtual item moving in the any channel.

Optionally, the third display unit is further configured to divide the interactive interface into the plurality of channels based on a width of the interactive interface, a width of each channel being greater than a width of the virtual item.

Optionally, the third display unit is further configured to determine the plurality of baselines in the interactive interface; and for any one of the plurality of virtual items, randomly determine any baseline from the plurality of baselines, and display an animation of the any virtual item moving along the any baseline.

Optionally, the third display unit is further configured to determine the plurality of baselines in the interactive interface based on a width of the interactive interface, a width between any two adjacent baselines in the plurality of baselines being greater than a width of the virtual item.

Optionally, the apparatus further includes:
a removal module, configured to remove, in response to any virtual item moving to a boundary line in the interactive interface in the target direction, the any virtual item from the interactive interface.

Optionally, the display module includes:
a rate acquisition unit, configured to acquire a movement rate of the at least one virtual item; and
a fourth display unit, configured to display an animation of the at least one virtual item moving at the corresponding movement rate.

Optionally, the display module includes:
a fifth display unit, configured to display movement animations of the plurality of virtual items in a plurality of display periods.

Optionally, the fifth display unit is configured to acquire movement rates respectively corresponding to the display periods, the movement rates of the plurality of display periods increasing progressively; and display the animations of the plurality of virtual items moving at the corresponding movement rate in each display period.

Optionally, the fifth display unit is further configured to determine a product of a sequence number of each display period in the plurality of display periods and an initial rate as the movement rate corresponding to the each display period.

Optionally, the item acquisition module includes:
an item acquisition unit, configured to determine, in response to a distance between the any virtual item and the virtual element being less than a distance threshold, that the any virtual item meets the virtual element, and acquire the any virtual item.

Optionally, the apparatus further includes a removal module; and
the removal module is configured to remove the any virtual item from the interactive interface in a case that the item acquisition module acquires the any virtual item.

Optionally, the display module is further configured to display a total quantity of acquired virtual items in the interactive interface.

Optionally, the item acquisition module includes:
an item acquisition unit, configured to acquire the any virtual item in a case that it is determined, by using a first application, that the any the virtual items meets the virtual element;
a notification transmission unit, configured to transmit a contact notification message to a second application by using the first application, the contact notification message carrying an identifier of the any virtual item; and
an item processing unit, configured to receive the contact notification message by using the second application, remove the any virtual item from the interactive interface based on the identifier of the any virtual item, and update the total quantity of acquired virtual items.

Optionally, the virtual item is a virtual resource packet, and at least one virtual resource packet includes a virtual resource; and the item acquisition module includes:
a resource delivering unit, configured to deliver, in response to any virtual resource packet meeting the virtual element, a virtual resource in the virtual resource packet to a resource account of a user identification currently logged in.

According to another aspect, a computer device is provided, including a processor and a memory, the memory storing at least one computer program, the at least one computer program being loaded and executed by the processor to implement the virtual item interaction method according to the foregoing aspects.

According to another aspect, a non-transitory computer-readable storage medium is provided, storing at least one computer program in the non-transitory computer-readable storage medium, the at least one computer program being loaded and executed by a processor to implement the virtual item interaction method according to the foregoing aspects.

According to another aspect, a computer program product or a computer program is provided, the computer program product or the computer program including computer program code, the computer program code being stored in a non-transitory computer-readable storage medium, a processor of a computer device reading the computer program code from the non-transitory computer-readable storage medium, and the processor executing the computer program code to implement the virtual item interaction method according to the foregoing aspects.

The technical solutions provided in the embodiments of this disclosure produce at least the following beneficial effects:

According to the method, the apparatus, the computer device, and the storage medium provided in the embodiments of this disclosure, the virtual item moves in the interactive interface, and a condition for acquiring the virtual item is that the virtual item meets the virtual element. Because the virtual element keeps overlapping the reference body part of the target object in the image, the user does not need to perform a single click action, and the position of the virtual element can be controlled by controlling the position of the reference body part of the target object, so that the virtual element can meet the virtual item to acquire the virtual item, thereby implementing the off-screen interaction, enhancing the user's interest, and preventing boredom of the user, and further increasing the attractiveness to the user and enhancing the interactivity.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other accompanying drawings from the accompanying drawings without creative efforts.

DESCRIPTION OF EMBODIMENTS

Figure 1:
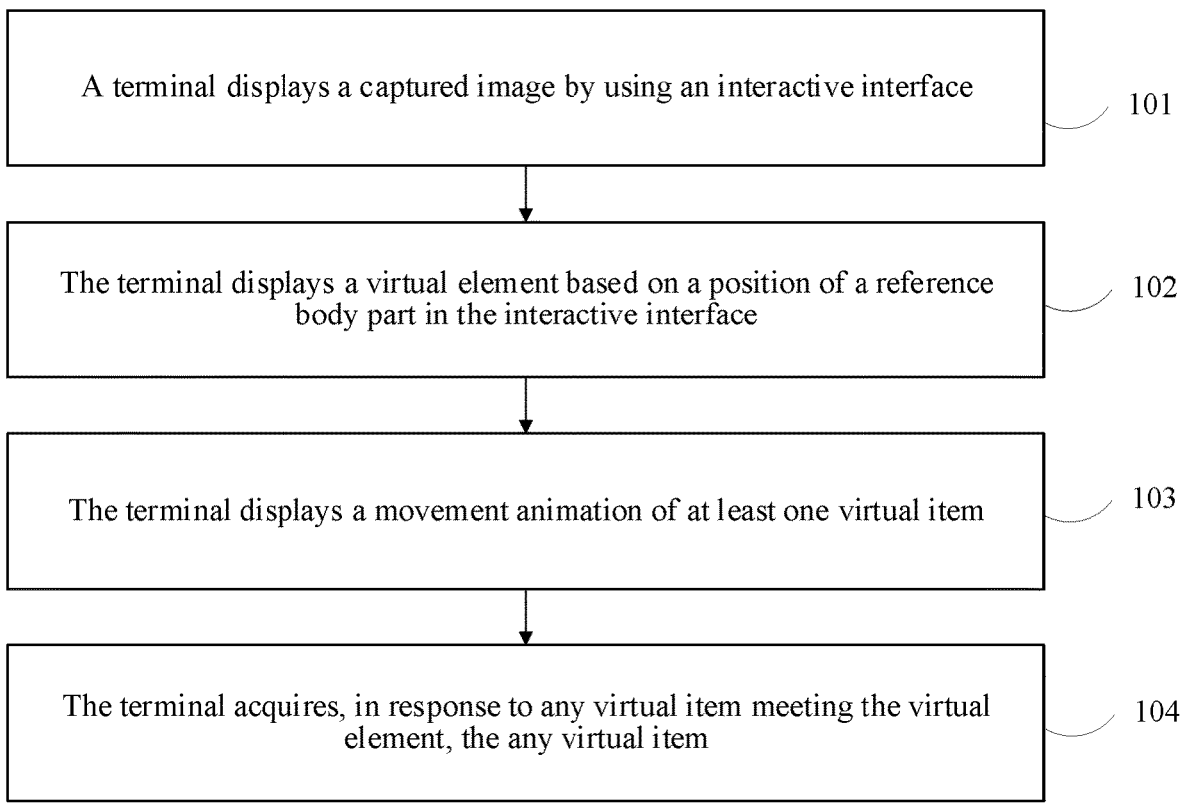
FIG. 1 is a flowchart of an exemplary virtual item interaction method according to an embodiment of this disclosure.

To make objectives, technical solutions, and advantages of the embodiments of this disclosure clearer, the following further describes in detail implementations of this application with reference to the accompanying drawings.

The terms "first", "second", etc. used in this application may be used for describing various concepts in this specification. However, the concepts are not limited by the terms unless otherwise specified. The terms are merely used for distinguishing one concept from another concept. For example, without departing from the scope of this application, a first application may be referred to as a second application, and similarly, the second application may be referred to as the first application.

For the terms "at least one", "a plurality of", "each", and "any" used in this application, "at least one" refers to "one", "two", or "more", "a plurality of" refers to "two" or "more", "each" refers to "each of a plurality of corresponding", and "any" refers to "any one of a plurality of". For example, when "a plurality of elements" refers to "three elements", "each" refers to "each of the three elements", and "any" refers to "any one of the three elements", that is, may be the first feature element, the second element, or the third element.

A virtual item interaction method provided in this embodiment of this disclosure is optionally applicable to a terminal. Optionally, the terminal is a plurality of types of terminals such as a smartphone, a computer, a tablet computer, and a vehicle-mounted terminal.

A captured image and a virtual element are displayed in an interactive interface of the terminal. The virtual element overlaps a reference part of a target object in the image, and a movement animation of at least one virtual item is displayed. In response to any virtual item meeting the virtual element, the any virtual item is acquired. In one implementation, the reference part of the target object may include a body part of the target object.

In addition, the virtual item interaction method provided in this embodiment of this disclosure is optionally applicable to an interactive application running on the terminal. The interactive application implements the interaction between a user and the terminal by using an interactive interface.

In a possible implementation, the interactive application is an application that runs independently on the terminal. Optionally, the interactive application is an instant messaging application, an electronic payment application, or another application. The terminal is installed with the interactive application, logs in the interactive application based on a user identification (ID), and implements the interaction between the user and the terminal by using the interactive application.

In another possible implementation, the interactive application is a sub-application running on an Internet application. Optionally, the Internet application is an instant messaging application, an electronic payment application, a map application, or another application. The interactive application is an official account or a mini program in the Internet application. The official account is a form of interaction that can implement comprehensive communication and interaction with users who follow the official account through text, pictures, voice, video, etc. The mini program is an application that can be used without being downloaded and installed. The terminal is installed with the Internet application, logs in the Internet application based on a user ID, and logs in the interactive application by using the user ID logging in the Internet application, thereby running the interactive application on the Internet application to implement the interaction between the user and the terminal.

The method provided in this embodiment of this disclosure can be applied to a man-machine interaction scenario.

For example, in a scenario of grabbing red packets,
  a lucky bag is a type of gift bag. In an example in which a virtual element is a lucky bag, a reference body part is a face, and a virtual item is a red packet, a user is photographed by a terminal to acquire an image, the terminal adopts the virtual item interaction method provided in this embodiment of this disclosure, and the lucky bag(s) and the acquired image are displayed in an interactive interface displayed on the terminal. The lucky bag overlaps the face of the user in the image, and a movement animation of at least one red packet is displayed, and then the user or the terminal moves to cause the face of the user to approach (or enter) the red packet. When the red packet meets (i.e., touches) the lucky bag, the user can receive the red packet (e.g., via the lucky bag), thereby implementing the off-screen interaction (i.e., user does not need to click or touch the screen) between the user and the terminal.

In another example, in a scenario of acquiring a game prop:
  a virtual object is used as an example of a virtual element, a face is used as an example of a reference body part, and a game prop is used as an example of a virtual item. In a game scenario, a user is photographed by using a terminal to acquire an image, the terminal adopts the virtual item interaction method provided in this embodiment of this disclosure, and the virtual object and the acquired image are displayed in a game scenario interface. The virtual object overlaps the face of the user in the image, and an animation of the virtual object running in the virtual scenario is displayed. Animations of a plurality of game props moving on a plurality of tracks are displayed in the game scenario interface, and the user and the terminal move relatively (or the user moves the terminal, so the virtual object moves relatively to the terminal), so that the virtual object changes the track in the game scenario interface to enable the virtual object to meet the game prop, and then the user can acquire the game prop, thereby implementing the off-screen interaction between the user and the terminal.

FIG. 1 is a flowchart of a virtual item interaction method according to an embodiment of this disclosure. The method is applied to a terminal. As shown in FIG. 1, the method includes the following steps:

101. A terminal displays a captured image by using an interactive interface.

In this embodiment of this disclosure, the terminal acquires the captured image, and a virtual item displayed in the interactive interface may be acquired by making a reference body part of a target object in the image overlapping with a virtual element, and controlling the virtual element to overlap the virtual item, thereby implementing the interaction between the user and the virtual item.

The interactive interface is an interface for information interaction between the user and the terminal. The user can input information into the terminal by using the interactive interface, and the terminal can also display information to the user by using the interactive interface, so that the user views the displayed information. In addition to displaying the captured image, the interactive interface can further display a virtual item, a virtual element, a background image, etc. A touch operation triggered by the user can be further acquired by using the interactive interface. For example, the user performs a touch operation on a display screen, and the terminal detects the touch operation by using the interactive interface, and thus responds to the touch operation.

The target object is an object interacting with the terminal, Optionally, the target object is any type of objects such as a person, an animal, a tree, etc. The target object is an object in a real scenario. By photographing the target object in a real scenario, an image including the target object can be acquired.

Optionally, the image is acquired by photographing the target object by the terminal, or acquired by photographing the target object by another device. For example, the terminal calls a camera to photograph the target object to acquire the image; or, the terminal receives the image transmitted by another device and acquires the image. Optionally, in addition to the target object, the image further includes a scene in which the target object is located. For example, if the image is acquired by photographing a person, the image further includes an indoor scene in which the person is located, such as a chair, a sofa, or a wall.

Optionally, before displaying the captured image, the terminal calls a camera to photograph the target object to acquire the captured image. Optionally, when the terminal calls the camera to photograph the target object, the camera photographs the target object in real time, or photographs the target object according to a duration threshold. For example, the terminal photographs a person in real time by calling the camera, and then displays an image acquired in real-time in the interactive interface. The image includes the person and a sofa, a window, a wall, etc. included in an environment in which the person is located. That is, all objects within a photographing range of the camera are displayed.

102. The terminal displays a virtual element based on a position of the reference body part in the interactive interface.

The reference body part is any body part of the target object. For example, when the target object is a person, the reference body part is the nose, the hand, the eye, etc. The virtual element is an element configured to meet the virtual item in the interactive interface to acquire the virtual item, the virtual element including a variety of display forms, such as a lucky bag, a dagger, a hammer, a knife, a sword, etc.

Because the image displayed in the interactive interface includes the reference body part of the target object, the reference body part is displayed in the interactive interface when the captured image is displayed in the interactive interface. Then, based on the position of the reference body part in the interactive interface, the virtual element is displayed so that the virtual element overlaps the reference body part of the target object in the image.

For a display form of the interactive interface, in a possible implementation, the terminal displays the captured image on a first layer, and displays the virtual element on a second layer. The second overlays the first layer so that the virtual element overlaps the reference body part of the target object included in the image, and the virtual element overlays an upper layer of the reference body part. All regions in the first layer display the captured image, and some regions in the second layer display the virtual element. Other regions of the second layer are set to a transparent state, in a case that the second layer overlays the upper layer of the first layer, the interactive interface can display a picture in which the virtual element overlaps the reference body part in the image, and the second layer does not block regions in the interactive interface other than a region in which the virtual element is located.

For a method for determining the position of the reference body part, in a possible implementation, a detection model is called to identify the reference body part in the captured image to determine the position of the reference body part in the interactive interface. The detection model is configured to identify the reference body part in the image. Optionally, a Tensorflow.js (an open-source hardware-accelerated script library) model is trained, and the trained Tensorflow.js model is used as the detection model. When an application starts, the Tensorflow.js model is loaded into an internal memory so that the Tensorflow.js model can be subsequently called to identify the reference body part in the image, so as to avoid the problem of excessively long loading time caused by repeated loading. Therefore, before the image and the virtual element are displayed in the interactive interface, it is necessary to first determine whether the Tensorflow.js model is loaded. If the Tensorflow.js model is not loaded, the Tensorflow.js model is loaded through Posenet.load (a loading method), and the Tensorflow.js model is loaded into the internal memory.

For example, the image displayed in the interactive interface includes a target face, and the reference body part is the nose on the target face. Then the terminal displays the image including the target face in the interactive interface, and calls the Tensorflow.js model in the internal memory to identify the nose in the image to determine a position of the nose on the target face in the interactive interface, and displays the virtual element at the position so that the virtual element overlaps the nose.

In another possible implementation, step 102 includes: calling, by the terminal, the detection model to identify the reference body part in the captured image, determining a coordinate value of the reference body part in the interactive interface, determining a target position of the reference body part in the interactive interface based on the coordinate value of the reference body part, and displaying the virtual element at the target position. A corresponding coordinate system is set in the interactive interface of the terminal. Optionally, an origin of the coordinate system is any point in the interactive interface, such as a point on the upper left corner of the interactive interface, or a center point of the interactive interface. The terminal calls the detection model to identify the reference body part, and then can acquire a coordinate value of the reference body part in the coordinate system corresponding to the interactive interface. The virtual element is displayed by using the coordinate value of the reference body part, thereby improving the accuracy of the overlapping of the virtual element and the reference body part.

In another possible implementation, after acquiring a plurality of captured images, the terminal circularly calls the detection model in the internal memory to identify the reference body part. For each image, the detection model returns a Poses (posture) array including the position of the reference body part. Based on the Poses array, the terminal can determine the position of the reference body part in the interactive interface when each image is displayed in the interactive interface, and then display the virtual element at the position of the reference body part in the interactive interface. The Poses array includes a coordinate value of the position of the reference body part in the interactive interface.

In addition, the terminal calls Window.RequestAnimationFrame (an image redrawing method), redraws the virtual element in the interactive interface based on the position of the reference body part in each image, so that the virtual element and the reference body part in the displayed image keep overlapping. and updates an animation through Animate (a callback function) to ensure that the displayed virtual element and the reference body part in the displayed image keep overlapping.

In addition, in a possible implementation, in response to a change in the position of the reference body part in the interactive interface, the virtual element is displayed based on the changed position of the reference body part, so that the virtual element and the reference body part keep overlapping.

Because the interactive interface displays the captured image, if the position of the reference body part in the image changes, the position of the reference body part displayed in the interactive interface also changes. To keep the virtual element overlapping the reference body part, a position of the virtual element in the interactive interface changes with the position of the reference body part, so as to achieve the effect of the virtual element moving with the reference body part in the interactive interface.

In this embodiment of this disclosure, optionally, the terminal photographs the target object in real time to acquire a plurality of images, and displays the acquired plurality of images in the interactive interface. The target object can move at will during photographing of the target object, and therefore, the position of the reference body part in the acquired plurality of images changes. When the plurality of images are displayed in the interactive interface, the reference body part is displayed in the interactive interface with an effect of moving freely. Because the virtual element and the reference body part keep overlapping, the virtual element is displayed in the interactive interface with an effect of moving with the reference body part.

In addition, to display the moving effect of the virtual element in the interactive interface, the reference body part in the captured image needs to move. Therefore, when the terminal photographs the target object, a relative movement occurs between the target object and the terminal, so that the reference body part in the captured image moves. For example, during photographing of the target object, the terminal keeps in position, and the target object moves, so that a relative movement occurs between the target object and the terminal, and the reference body part in the captured image moves; or, the target object keeps in position, and the user moves the terminal held by the user to cause a relative movement between the target object and the terminal, so that the reference body part in the captured image moves.

This embodiment of this disclosure is described by using an example in which the captured image is displayed in the interactive interface, and the virtual element is then displayed. In another embodiment, there is no need to perform step 101 and step 102, and another display manner may be alternatively used, as long as it is ensured that the virtual element and the captured image are displayed by using the interactive interface.

103. The terminal displays a movement animation of at least one virtual item.

Optionally, the virtual item may be displayed in any form, such as a red packet, a balloon, or an ingot.

The virtual item can move at will or following a predetermined trajectory in the interactive interface. For example, during the movement of the virtual item in the interactive interface, if the virtual item meets another virtual item, or the virtual item moves to a position of a boundary line in the interactive interface, the virtual item changes the current movement direction and moves in another direction. When the virtual item meets another virtual item again or moves to the position of the boundary line, the virtual item changes the movement direction again, so that the virtual item is displayed in the interactive interface with an effect of moving at will, or the displayed effect conforms to a movement law of a real object. Optionally, the virtual item moves along a straight line in the interactive interface. The virtual item moves in a target direction when moving along a straight line. For example, the virtual item moves in the target direction from one boundary line in the interactive interface to the other boundary line on an opposite side in the interactive interface, and both boundary lines are perpendicular to the target direction.

In a possible implementation, step 103 is any one of the following three steps:

Step 1. Display animations of a plurality of virtual items moving in a target direction.

Optionally, the target direction is any direction. If the target direction is a downward direction, the plurality of virtual items are displayed in the interactive interface from an upper boundary line in the interactive interface, and move in the downward direction to a position of a lower boundary line. In response to any virtual item moving to the lower boundary line, the virtual item is removed from the interactive interface. For example, the virtual item is a red packet, a plurality of red packets are displayed in the interactive interface from the upper boundary line and move in the downward direction to the position of the lower boundary line. In response to any red packet moving to the lower boundary line, the red packet is removed from the interactive interface, thereby displaying the effect of a red packet rain in the interactive interface, in a possible implementation, a distance between any two adjacent virtual items in the target direction in the plurality of virtual items is the target distance; or, an interval between display time periods of any two adjacent virtual items in the plurality of virtual items is a target duration.

Optionally, the target distance is a distance set arbitrarily, such as 5 mm or 8 mm. In the process of the plurality of virtual items moving in the target direction, any two adjacent virtual items keep the target distance in the target direction, thereby avoiding overlapping of the virtual items displayed in the interactive interface, and also avoiding simultaneous appearing of the plurality of virtual items in the interactive interface, helping the user to control the virtual element to acquire the virtual item subsequently, and further increasing the attractiveness to the user.

Optionally, the target duration is a duration set arbitrarily, such as 0.1 second or 0.2 second. In the process of the plurality of virtual items moving in the target direction, an interval between display time periods of any two adjacent virtual items is the target duration, thereby avoiding overlapping of the virtual items displayed in the interactive interface, and also avoiding simultaneous appearing of the plurality of virtual items in the interactive interface, helping the user to control the virtual element to acquire the virtual item subsequently, and further increasing the attractiveness to the user.

In a possible implementation, step 1 includes: acquiring a distance between any two adjacent virtual items in the plurality of virtual items in the target direction, and displaying, based on the acquired distance, the animations of the plurality of virtual items moving in the target direction. Optionally, distances between any two adjacent virtual items in the plurality of virtual items are equal or different. For example, for three adjacent virtual items, a distance between the first virtual item and the second virtual item is 4 mm, and a distance between the second virtual item and the third virtual item is also 4 mm. or, the distance between the first virtual item and the second virtual item is 5 mm, and the distance between the second virtual item and the third virtual item is 3 mm.

Any two adjacent virtual items in the plurality of virtual items correspond to a distance. Before movement animations of the plurality of virtual items are displayed in the interactive interface, the distance between any two adjacent virtual items is acquired, and animations of the any two adjacent virtual items moving in the target direction according to the acquired distance is then displayed in the interactive interface, so that any two adjacent virtual items in the displayed plurality of virtual items keep a corresponding distance from each other.

For the foregoing method for acquiring the distance between any two virtual items in the target direction, in a possible implementation, for the any two virtual items, a random value is acquired based on a target value range, and a product of an initial distance and the random value is determined as the distance between the any two virtual items in the target direction. Optionally, the initial distance is set arbitrarily, such as 3 mm or 5 mm. Optionally, the target value range is also set arbitrarily. For example, the target value range is (0, 1), or the target value range is (1, 10). The distance between any two virtual items in the target direction is determined based on the random value, thereby ensuring randomization of the distance. That is, the distances between the plurality of virtual items are random, which can improve the display flexibility of the virtual items, and prevent boredom of the user caused by a single and rigid display manner.

For example, for 3 virtual items, if the initial distance is 5 mm, a random value corresponding to the first virtual item and the second virtual item is 2, and a random value corresponding to the second virtual item and the third virtual item is 1, a distance between the first virtual item and the second virtual item is 10 mm, and a distance between the second virtual item and the third virtual item in the target direction is 5 mm.

In a possible implementation, step 1 includes: displaying animations of the plurality of virtual items respectively moving in a plurality of channels, a direction of the plurality of channels being the target direction; or, displaying animations of the plurality of virtual items respectively moving along a plurality of baselines, a direction of the plurality of baselines being the target direction.

The plurality of channels and the plurality of baselines are not displayed in the interactive interface. A center of the virtual item coincides with a center line in the channel if the virtual item moves in the channel; or the center of the virtual item coincides with the baseline if the virtual item moves along the baseline.

By setting the plurality of channels or the plurality of baselines in the interactive interface, the plurality of virtual items are randomly distributed in the interactive interface according to the plurality of channels or the plurality of baselines when the plurality of virtual items are displayed in the interactive interface, thereby avoiding a case that the plurality of virtual items moves along the same straight line, enriching display manners, and increasing the attractiveness to the user.

For the foregoing method for determining the channel for the virtual item, in a possible implementation, the plurality of channels in the interactive interface are determined; and for any one of the plurality of virtual items, any channel is randomly determined from the plurality of channels, and an animation of the any virtual item moving in the any channel is displayed. For example, the plurality of channels correspond to channel serial numbers in sequence according to an arrangement order. In a case of determining any channel for the virtual item, a channel serial number is randomly determined from a plurality of channel serial numbers, and the channel corresponding to the channel serial number is determined as the channel in which the virtual item moves.

For the foregoing method for determining the plurality of channels in the interactive interface, in a possible implementation, the interactive interface is divided into the plurality of channels based on the width of the interactive interface. The width of each channel is greater than the width of the virtual item, so as to ensure that the virtual item can be completely displayed when the virtual item moves in any channel.

For example, the interactive interface is equally divided into 10 regions according to the width of the interactive interface. The width of each region is denoted as Positionx (horizontal width), and each region serves as a channel. When the channel is determined for the virtual item, a random value 5 is generated for the virtual item based on random values in a range of (1, 10), and the fifth channel is determined based on 5*Positionx by using a left boundary of the interactive interface a benchmark, and a movement picture of the virtual item is then displayed in the fifth channel.

For the foregoing method for determining the baseline for the virtual item, in a possible implementation, the plurality of baselines in the interactive interface are determined, and for any one of the plurality of virtual items, any baseline is randomly determined from the plurality of baselines, and an animation of the any virtual item moving along the any baseline is displayed. For example, the plurality of baselines correspond to baseline serial numbers in sequence according to an arrangement order. When any baseline is determined for the virtual item, a baseline serial number is randomly determined from the plurality of baseline serial numbers, and an animation of the virtual item moving along the baseline corresponding to the baseline number is displayed.

For the foregoing method for determining the plurality of baselines, in a possible implementation, the plurality of baselines in the interactive interface are determined based on the width of the interactive interface. The width between any two adjacent baselines in the plurality of baselines being greater than the width of the virtual item. In a case of determining the plurality of baselines, because there are boundary lines in the interactive interface, if the determined baseline coincides with the boundary line, the virtual item cannot be displayed completely when the virtual item moves along the boundary line. Therefore, the width between any baseline and the boundary line in the interactive interface is greater than the width of the virtual item in a case of determining the plurality of baselines in the interactive interface, thereby ensuring the integrity of the displayed virtual item.

In another possible implementation, the plurality of baselines in the interactive interface are determined based on the width of the interactive interface, and the width between any baseline in the plurality of baselines and the boundary line in the interactive interface is greater than the width of the virtual item.

Step 2: Acquire a movement rate of the at least one virtual item; and display an animation of the at least one virtual item moving at the corresponding movement rate.

Optionally, the movement rate is arbitrarily set. Optionally, different virtual items correspond to the same movement rate or different movement rates.

For a method for determining the movement rate corresponding to the virtual item, in a possible implementation, according to an order of a plurality of virtual items, movement rates of the plurality of virtual items increase progressively.

Step 3: Display movement animations of a plurality of virtual items in a plurality of display periods.

Optionally, the plurality of display periods are divided according to the quantity of the virtual items, or according to a display duration. For example, if the quantity of the virtual items displayed in each display period is the same, the movement animations of the plurality of virtual items are displayed in the plurality of display periods.

Optionally, there is a duration interval threshold between adjacent display periods in the plurality of display periods. For example, the duration threshold is 10 seconds. After the first display period ends, when a duration interval reaches 10 seconds, the second display period is entered. In the second display period, the movement animations of the plurality of virtual items are displayed.

In a possible implementation, step 3 includes: acquiring movement rates respectively corresponding to the display periods, and displaying the animations of the plurality of virtual items moving at the corresponding movement rate in each of the display periods. The movement rates of the plurality of display periods increase progressively.

In this embodiment of this disclosure, in any display period of the plurality of display periods, the animations of the plurality of virtual items moving at the corresponding movement speed are displayed. In the next display period of the any display period, animations of the virtual item moving at the movement speed corresponding to the next display period are displayed, so that the displayed virtual items move at a higher movement speed.

For a method for acquiring the movement speeds respectively corresponding to the display periods, in a possible implementation, a product of a sequence number of each display period in the plurality of display periods and an initial rate is determined as the movement speed corresponding to the each display period. The initial rate is a randomly set value, such as 2 cm per second or 3 cm per second. The plurality of display periods are arranged in chronological order, and each display period corresponds to a sequence number. When the movement speed corresponding to any display period is determined, a product of the sequence number corresponding to the any display period and the initial rate is used as the movement speed corresponding to the any display period, so that the plurality of virtual items move at a higher movement speed when the virtual items are displayed in the plurality of display periods.

In this embodiment of this disclosure, the foregoing three methods are merely described separately. In the foregoing three methods, optionally, any two methods are combined, or three methods are combined, and details are not described herein again.

For example, a Red Packet Total Num (the total quantity of red packets), the Red Packet Item Num (the quantity of red packets) in each display period, and an interval between two adjacent display periods are set. A Set Timeout function is used for creating a Red Packet Item Num of red packets every interval. The plurality of channels in the interactive interface are determined, a Random (random value) is generated for red packets in each display period, and a movement channel is determined for each red packet based on a product Random*Positionx of the random value and Positionx (channel width). An altitude is determined for the plurality of red packets in each display period, and a Random (random value) is generated for the red packets in the each display period. Then a distance between two adjacent red packets is Altitude*Random, and through the channel corresponding to each red packet and the distance between two adjacent red packets, it can be determined that a position of each to-be-displayed red packet is {X: Positionx*Random, Y: Altitude*Random}. That is, in the interactive interface, when the red packet is about to be displayed, an x-axis coordinate value is Positionx*Random, and a y-axis coordinate value is Altitude*Random. A Rate (initial rate) is determined, and a product of the sequence number of each display period and the Rate is used as the movement speed of the corresponding display period. The movement animations of the plurality of virtual items moving in the plurality of display periods are displayed in the interactive interface, and as the sequence number of the display period increases, the movement speed becomes increasingly higher.

104. The terminal acquires, in response to any virtual item meeting the virtual element, the any virtual item.

In this embodiment of this disclosure, the virtual element and the movement animation of the at least one virtual item are displayed in the interactive interface. Therefore, in response to the any virtual item meeting the virtual element, the any virtual item is acquired through the virtual element.

in a possible implementation, step 104 includes: in response to a distance between the any virtual item and the virtual element being less than a distance threshold, determining that the any virtual item meets the virtual element, and acquiring the any virtual item. Optionally, the distance threshold is an arbitrarily set distance. In the interactive interface, if a distance between any virtual item and the virtual element is less than the distance threshold, it is determined that the any virtual item meets the virtual element.

For a method for determining the distance between the virtual item and the virtual element, in a possible implementation, location information of the virtual element and location information of the virtual item are acquired, and the distance between the virtual element and the virtual item is determined based on the location information of the virtual element and the location information of the virtual item. The location information is used for indicating a location in the interactive interface. The distance between the virtual item and the virtual element can be determined based on the location information of the virtual item and the location information of the virtual element.

Optionally, the location information includes coordinate values in the interactive interface. The distance between the virtual item and the virtual element can be determined by using coordinate values of the virtual item and coordinate values of the virtual element. For example, using a center location in the interactive interface as an origin of a coordinate system, the location information of the virtual element includes coordinate values of (10, 12), and the location information of the virtual item includes coordinate values of (9, 11). The distance between the virtual item and the virtual element is determined based on the coordinate values of the virtual item and the coordinate values of the virtual element.

in a possible implementation, step 104 includes: in response to the any virtual item meeting the virtual element, acquiring the any virtual item, and removing the any virtual item from the interactive interface. The acquired virtual item is removed from the interactive interface to avoid repeatedly acquiring the same virtual item, thereby achieving the accurate interaction.

in a possible implementation, step 104 includes: acquiring the any the virtual item in a case that it is determined, by using a first application, that the any virtual item meets the virtual element, and transmitting a contact notification message to a second application, the contact notification message carrying an identifier of the any virtual item; and receiving the contact notification message by using the second application, removing the any virtual item from the interactive interface based on the identifier of the any virtual item, and updating the total quantity of acquired virtual items.

The first application is configured to determine that the virtual item meets the virtual element, to acquire the virtual item. The second application is configured to remove the acquired virtual item from the interactive interface and update the total quantity of acquired virtual items. Optionally, the first application and the second application are executed concurrently. The first application transmits the contact notification message to the second application when the first application determines that the any virtual item meets the virtual element, and then, the first application performs a step of acquiring the any virtual item. In this case, the second application performs steps of removing the acquired virtual item and updating the total quantity of acquired virtual items. In this process, the first application and the second application are executed synchronously.

In the plurality of virtual items, each virtual item has a unique identifier, such as a universally unique identifier (UUID). When any virtual item is acquired, to avoid repeatedly acquiring the same virtual item, it is necessary to remove the acquired virtual item from the interactive interface. By setting a unique identifier for each virtual item, the unique virtual item can be determined through the identifier, so that the acquired virtual item can be removed in a removal process, thereby improving the accuracy of removing the virtual item. In addition, the total quantity of acquired virtual items is 0 at the beginning of acquiring the virtual item, and each time a virtual item is acquired, the total quantity of acquired virtual items increases by 1.

To improve the accuracy of the total quantity of acquired virtual items, each time any virtual item is acquired, the identifier of the any virtual item is stored in a database. When the identifier is stored, it is necessary to determine whether the same identifier is stored, and in a case that the same identifier is not stored, the identifier is stored in the database. The total quantity of the acquired virtual items can be determined based on the quantity of identifiers stored in the database, thereby avoiding a case that a virtual item is repeatedly counted.

In a possible implementation, the virtual item is a virtual resource packet, and at least one virtual resource packet includes a virtual resource, and step 104 includes: in response to any virtual resource packet meeting the virtual element, delivering a virtual resource in the virtual resource packet to a resource account of a user identification currently logged in. Optionally, the virtual resource is coupons, virtual currencies, points, etc. When any virtual resource packet is acquired, the virtual resource included in the virtual resource pack is acquired, and the virtual resource is delivered to the resource account of the user identification currently logged in, so that a user performs an operation such as payment or resource type conversion by using the virtual resource in the resource account subsequently. In the plurality of virtual resource packets, some virtual resource packets include the virtual resource, and some virtual resource packets do not include the virtual resource. When any virtual resource package is acquired, if the virtual resource packet does not include the virtual resource, the total quantity of virtual items acquired by the user identification is increased by 1, but no virtual resource is delivered to the resource account of the user identification.

Optionally, when determining that any virtual item meets the virtual element, the terminal displays an animation of acquiring the virtual item in the interactive interface. For example, the virtual item is a red packet and the virtual element is a lucky bag. When the red packet meets the lucky bag, an animation that the red packet falls into the lucky bag is displayed in the interactive interface to remind the user that the red packet is acquired. For another example, the virtual item is a balloon, and the virtual element is a dagger. When the balloon meets the dagger, an animation that the dagger pierces the balloon is displayed in the interactive interface to remind the user that the balloon is acquired. For yet another example, the virtual item is an ingot and the virtual element is a hammer. When the ingot meets the hammer, an animation that the hammer smashes the ingot is displayed in the interactive interface to remind the user that the ingot is acquired.

In addition, in a possible implementation, the method further includes: displaying the total quantity of acquired virtual items in the interactive interface. Optionally, the total quantity of acquired virtual items is displayed in real time in any region in the interactive interface.

This embodiment of this disclosure is merely described by using acquisition of the virtual item as an example. In another embodiment, for the virtual item that does meet the virtual element in the interactive interface, in response to any virtual item moving to an end line in the interactive interface in the target direction, the any virtual item is removed from the interactive interface. Optionally, two edge lines in the interactive interface are perpendicular to the target direction. The virtual item moves from one of the edge lines in the target direction to approach the other edge line. The other edge line is referred to as an end line in the interactive interface in the target direction. If the virtual item moves to the end line, it means that the virtual item does not meet the virtual element during the movement, and the virtual item needs to be removed.

This embodiment of this disclosure is merely described by using the process of acquiring the virtual item as an example. In another embodiment, according to an arrangement sequence of the plurality of virtual items, animations of the virtual items moving in the target direction are displayed in turn. In response to the last virtual item being acquired, display of the movement animation of the virtual item ends, and the total quantity of acquired virtual items is displayed in the interactive interface.

For a process of ending display of the movement animation of the virtual item, in a possible implementation, according to an arrangement sequence of the plurality of virtual items, the animations of the virtual items moving in the target direction are displayed in turn. In response to displaying the last virtual item in the interactive interface, it is determined that display of the plurality of virtual items is completed. In response to no virtual item is included in the interactive interface, it is determined that the display ends, and the total quantity of acquired virtual items is displayed in the interactive interface.

Descriptions in this embodiment of this disclosure start from displaying the captured image in the interactive interface. Before the terminal displays the virtual element and the captured image by using the interactive interface, a display scenario of the interactive interface needs to be initialized. Optionally, by loading Three.js (a three-dimensional scenario engine), creating a virtual camera and a renderer, and adding ambient light, a display form in the interactive interface can be adjusted through the virtual camera, the renderer, and the ambient light during subsequent display of the image and the virtual element in the interactive interface. The virtual camera is configured to adjust view angles of the displayed virtual element and the virtual item, so that sizes of the displayed virtual element and the virtual item match the displayed image, thereby avoiding a case that the virtual element displayed in the interactive interface is too large or too small. The renderer is configured to render the captured image, the virtual item, and the virtual element. The virtual object and the virtual element are merged with the image to acquire a new image, and the rendered image is displayed in the interactive interface. The ambient light is configured to adjust a color of the displayed image. By adding the ambient light to the displayed image, the display effect of the image in the interactive interface is enhanced.

Figure 2:
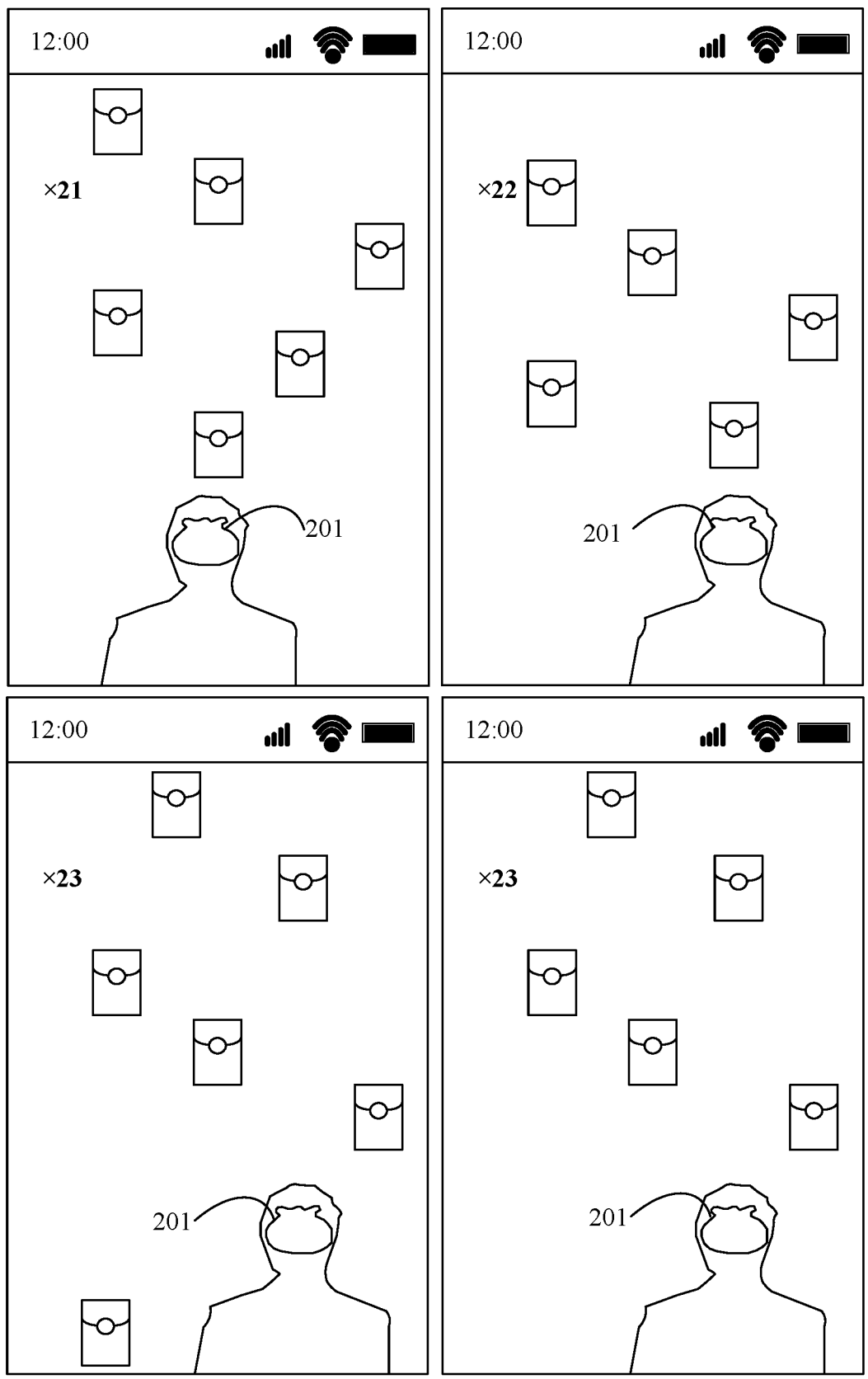
FIG. 2 is a schematic diagram of an exemplary interactive interface according to an embodiment of this disclosure.

As shown in FIG. 2, the terminal captures a face of a user in real time through the camera, acquires an image including the face of the user in real time, and displays the captured image and a lucky bag 201 in the interactive interface. The lucky bag 201 overlaps a position of the face of the user in the image (i.e., the face is the reference object), and a red packet rain is displayed in the interactive interface. By moving the face of the user, the user changes the position of the face of the user in the interactive interface, and drives the lucky bag 201 to move in the interactive interface, so that the lucky bag 201 can meet a plurality of red packets in the red packet rain, thereby acquiring the plurality of red packets. In addition, the total quantity of red packets that the user has acquired is further displayed in the interactive interface (e.g., −x21, x22, or x23 as shown in FIG. 2). When a red packet in the red packet rain moves to a lower boundary line in the interactive interface, the red packet is removed from the interactive interface. In this process, the user can drive the lucky bag 201 by moving the face, thereby acquiring the red packet, thereby implementing the off-screen interaction.

In the method provided in the embodiments of this disclosure, the virtual item moves in the interactive interface, and a condition for acquiring the virtual item is that the virtual item meets the virtual element. Because the virtual element keeps overlapping the reference body part of the target object in the image, the user does not need to perform a single click action, and the position of the virtual element can be controlled by controlling the position of the reference body part of the target object, so that the virtual element can meet the virtual item to acquire the virtual item, thereby implementing the off-screen interaction, enhancing the user's interest, and preventing boredom of the user, and further increasing the attractiveness to the user and enhancing the interactivity.

In the process of the plurality of virtual items moving in the target direction, any two adjacent virtual items keep the target distance in the target direction, or an interval between display time periods of any two adjacent virtual items is the target duration, thereby avoiding overlapping of the virtual items displayed in the interactive interface, and also avoiding simultaneous appearing of the plurality of virtual items in the interactive interface, helping the user to control the virtual element to acquire the virtual item subsequently, and further increasing the attractiveness to the user.

The distance between any two virtual items in the target direction is determined based on a random value, so as to ensure randomization of the distance. That is, the distances between the plurality of virtual items are random, which can improve the display flexibility of the virtual items, and prevent boredom of the user caused by a single and rigid display manner.

Figure 3:
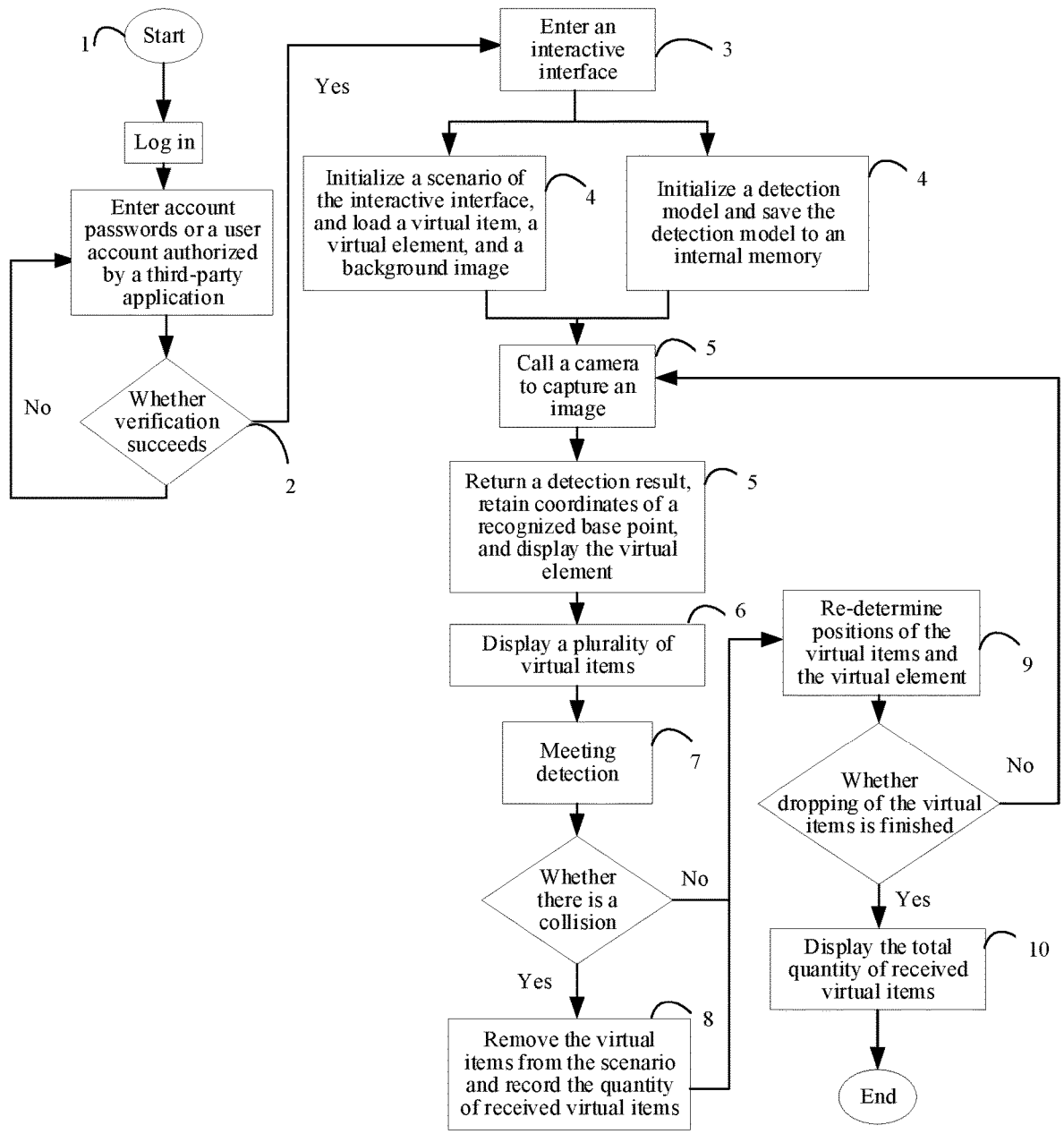
FIG. 3 is a flowchart of an exemplary virtual item interaction method according to an embodiment of this disclosure.

FIG. 3 is a flowchart of a virtual item interaction method according to an embodiment of this disclosure. The process includes the following steps:

1. Start an application and display a login interface.
2. Based on the login interface, acquire an entered user account or a user account authorized by a third-party application, and verify the acquired user account.
3. In response to a success of the verification of the user account, complete the startup of the application and display an interactive interface; or, in response to a failure of the verification of the user account, display a prompt message in the login interface, the prompt message being used for prompting re-entering of the user account.
4. When the interactive interface is displayed, load a virtual item, a virtual element, and a background image to complete initialization of a display scenario in an interactive interface, to facilitate subsequent display of the virtual item, the virtual element, and the background image in the interactive interface, and load a detection model to an internal memory for subsequent calling.
5. Call a camera of a terminal to photograph a target object to acquire a captured image, call the detection model to detect the captured image, determine a position of a reference body part of the target object in the interactive interface, and display the virtual element at the position.
6. Display animations of a plurality of virtual items moving in a target direction in the interactive interface.
7. Perform meeting detection on the plurality of virtual items to determine a distance between each virtual item and the virtual element, determine, in response to the distance between any virtual item and the virtual element being less than a distance threshold, that the any virtual item meets the virtual element, and determine, in response to the distance between any virtual item and the virtual element being not less than the distance threshold, that the any virtual item does not meet the virtual element.
8. For the virtual item that meets the virtual element, remove the virtual item from the interactive interface, and record the quantity of acquired red packets.
9. For the virtual item that does not meet the virtual element, re-determine positions of the virtual element and the virtual item, and display the animations of the plurality of virtual items moving in the target direction in the interactive interface.
10. Detect whether dropping of the plurality of virtual items is finished, repeat the foregoing steps 5 to 9 if the dropping of virtual items is not finished; or display the total quantity of acquired virtual items in the interactive interface if the dropping of virtual items is finished, and end the interaction.

Figure 4:
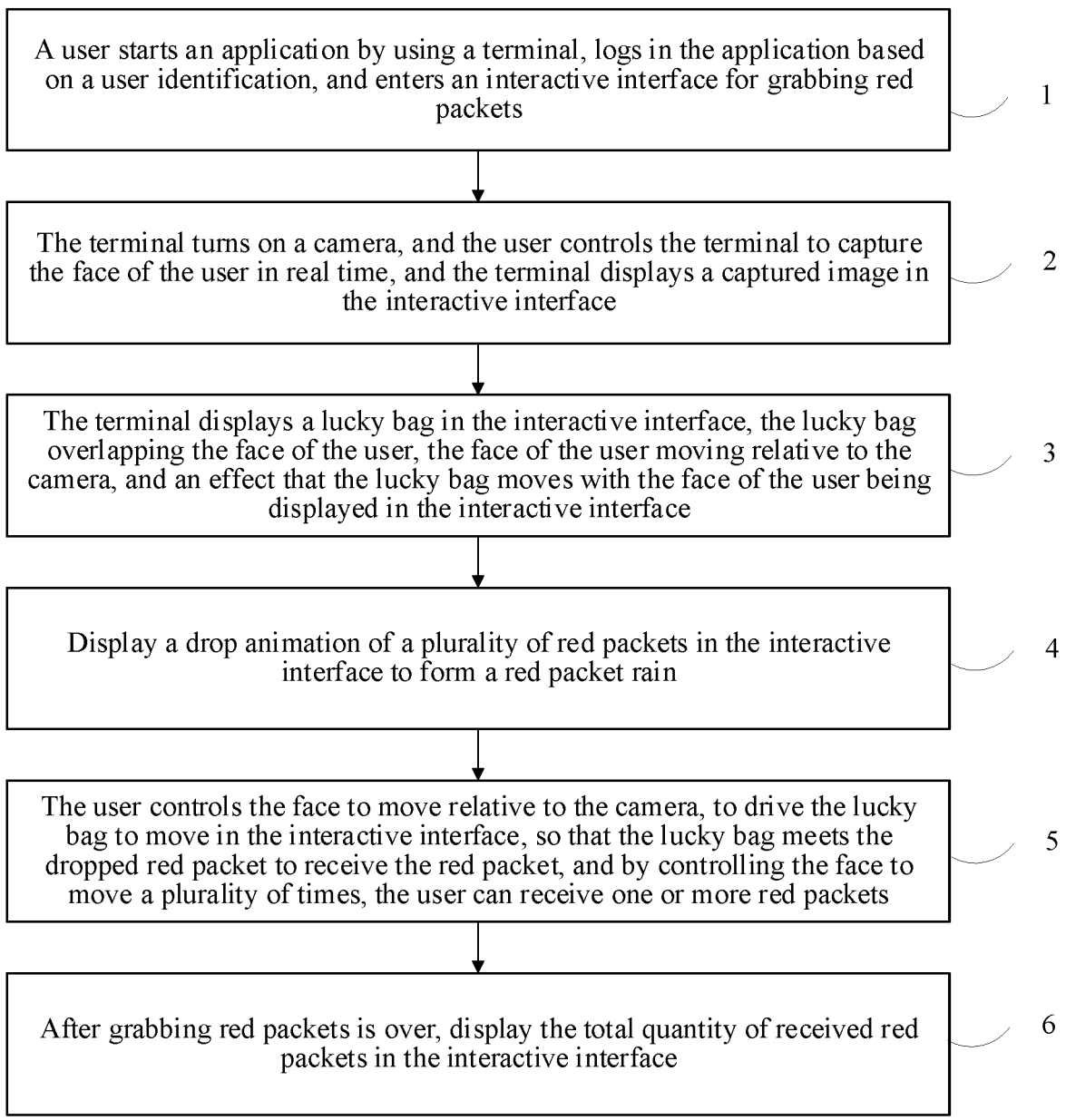
FIG. 4 is a flowchart of an exemplary virtual item interaction method according to an embodiment of this disclosure.

FIG. 4 is a flowchart of a virtual item interaction method according to an embodiment of this disclosure. Using an example in which a user receives a red packet, the process includes the following steps:

1. A user starts an application by using a terminal, logs in the application based on a user identification, and enters an interactive interface for grabbing red packets.

2. The terminal turns on a camera, and the user controls the terminal to photograph the face of the user in real time, and the terminal displays a captured image in the interactive interface.

3. The terminal displays a lucky bag in the interactive interface, the lucky bag overlapping the face of the user, the face of the user moving relative to the camera, and an effect that the lucky bag moves with the face of the user being displayed in the interactive interface.

4. Display a drop animation of a plurality of red packets in the interactive interface to form a red packet rain.

5. The user controls the face to move relative to the camera, to drive the lucky bag to move in the interactive interface, so that the lucky bag meets the dropped red packet to receive the red packet, and by controlling the face to move a plurality of times, the user can receive one or more red packets.

6. After grabbing red packets is over, display the total quantity of received red packets in the interactive interface.

Figure 5:
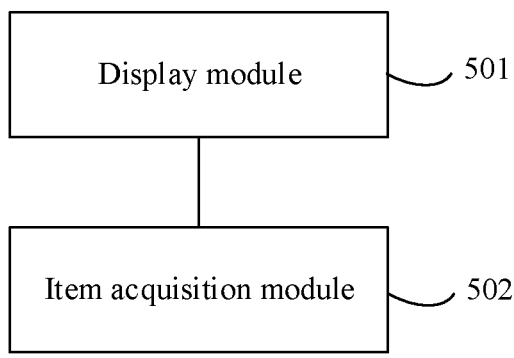
FIG. 5 is a schematic structural diagram of an exemplary virtual item interaction apparatus according to an embodiment of this disclosure.

FIG. 5 is a schematic structural diagram of a virtual item interaction apparatus according to an embodiment of this disclosure. In this disclosure, a unit and a module may be hardware such as a combination of electronic circuitries; firmware; or software such as computer instructions. The unit and the module may also be any combination of hardware, firmware, and software. In some implementation, a unit may include at least one module. As shown in FIG. 5, the apparatus includes:

a display module 501, configured to display a virtual element and a captured image by using an interactive interface, the virtual element overlapping a reference body part of a target object in the image, the display module 501 being further configured to display a movement animation of at least one virtual item; and an item acquisition module 502, configured to acquire, in response to any virtual item meeting the virtual element, the any virtual item.

In the apparatus provided in this embodiment of this disclosure, the virtual item moves in the interactive interface, and a condition for acquiring the virtual item is that the virtual item meets the virtual element. Because the virtual element keeps overlapping the reference body part of the target object in the image, the user does not need to perform a single click action, and the position of the virtual element can be controlled by controlling the position of the reference body part of the target object, so that the virtual element can meet the virtual item to acquire the virtual item, thereby implementing the off-screen interaction, enhancing the user's interest, and preventing boredom of the user, and further increasing the attractiveness to the user and enhancing the interactivity.

Figure 6:
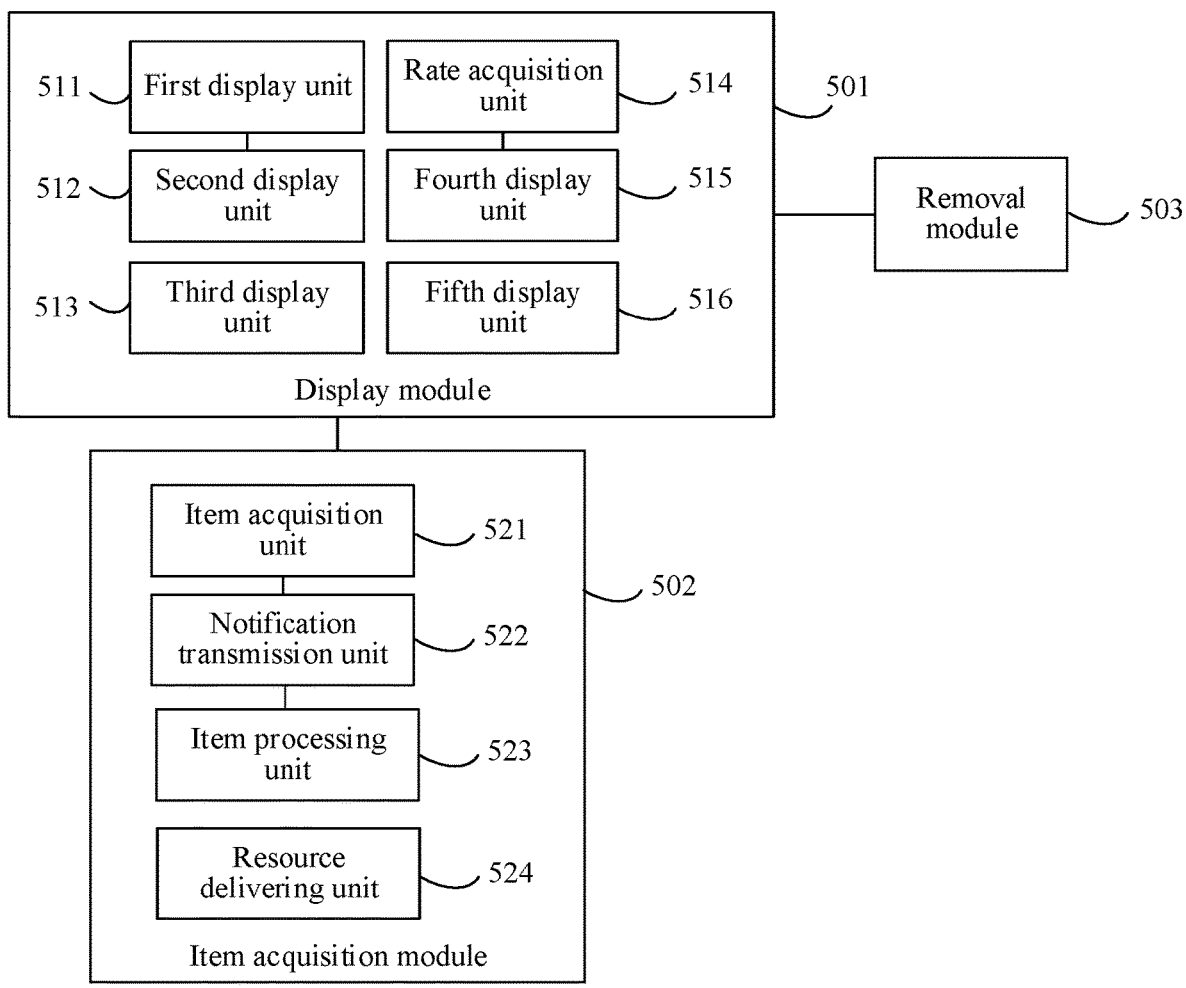
FIG. 6 is a schematic structural diagram of an exemplary virtual item interaction apparatus according to an embodiment of this disclosure.

Optionally, referring to FIG. 6, the display module 501 includes:

a first display unit 511, configured to display the captured image by using the interactive interface; and a second display unit 512, configured to display the virtual element based on a position of the reference body part in the interactive interface.

Optionally, the display module 501 is further configured to display, in response to a change in the position of the reference body part in the interactive interface, the virtual element based on the changed position of the reference body part, so that the virtual element and the reference body part keep overlapping.

Optionally, referring to FIG. 6, the display module 501 includes:

a third display unit 513, configured to display animations of a plurality of virtual items moving in a target direction.

Optionally, a distance between any two adjacent virtual items in the target direction in the plurality of virtual items is a target distance; or, an interval between display time periods of any two adjacent virtual items in the plurality of virtual items is a target duration.

Optionally, the third display unit 513 is configured to acquire a distance between any two adjacent virtual items in the target direction in the plurality of virtual items; and display the animations of the plurality of virtual items moving in the target direction based on the acquired distance.

Optionally, the third display unit 513 is further configured to acquire a random value based on a target value range for the any two virtual items; and determine a product of an initial distance and the random value as the distance between the any two virtual items in the target direction.

Optionally, the third display unit 513 is further configured to:

display animations of the plurality of virtual items respectively moving in a plurality of channels, a direction of the plurality of channels being the target direction; or, displaying animations of the plurality of virtual items respectively moving along a plurality of baselines, a direction of the plurality of baselines being the target direction.

Optionally, the third display unit 513 is further configured to determine the plurality of channels in the interactive interface; and for any one of the plurality of virtual items, determine any channel from the plurality of channels, and display an animation of the any virtual item moving in the any channel.

Optionally, the third display unit 513 is further configured to divide the interactive interface into the plurality of channels based on a width of the interactive interface, a width of each channel being greater than a width of the virtual item.

Optionally, the third display unit 513 is further configured to determine the plurality of baselines in the interactive interface; and for any one of the plurality of virtual items, randomly determine any baseline from the plurality of baselines, and display an animation of the any virtual item moving along the any baseline.

Optionally, the third display unit 513 is further configured to determine the plurality of baselines in the interactive interface based on a width of the interactive interface, a width between any two adjacent baselines in the plurality of baselines being greater than a width of the virtual item.

Optionally, referring to FIG. 6, the apparatus further includes:

a removal module 503, configured to remove, in response to any virtual item moving to a boundary line in the interactive interface in the target direction, the any virtual item from the interactive interface.

Optionally, referring to FIG. 6, the display module 501 includes:

a rate acquisition unit 514, configured to acquire a movement speed of the at least one virtual item; and a fourth display unit 515, configured to display an animation of the at least one virtual item moving at the corresponding movement speed.

Optionally, referring to FIG. 6, the display module 501 includes:

a fifth display unit 516, configured to display movement animations of the plurality of virtual items in a plurality of display periods.

Optionally, the fifth display unit 516 is configured to acquire movement speeds respectively corresponding to the display periods, the movement speeds of the plurality of display periods increasing progressively; and display the animations of the plurality of virtual items moving at the corresponding movement speed in each display period.

Optionally, the fifth display unit 516 is further configured to determine a product of a sequence number of each display period in the plurality of display periods and an initial rate as the movement speed corresponding to the each display period.

Optionally, referring to FIG. 6, the item acquisition module 502 includes:

an item acquisition unit 521, configured to determine, in response to a distance between the any virtual item and the virtual element being less than a distance threshold, that the any virtual item meets the virtual element, and acquire the any virtual item.

Optionally, referring to FIG. 6, the apparatus further includes a removal module 503; and the removal module 503 is configured to remove the any virtual item from the interactive interface in a case that the item acquisition module acquires the any virtual item.

Optionally, the display module 501 is further configured to display a total quantity of acquired virtual items in the interactive interface.

Optionally, referring to FIG. 6, the item acquisition module 502 includes:

an item acquisition unit 521, configured to acquire the any virtual item in a case that it is determined, by using a first application, that the any virtual item meets the virtual element;

a notification transmission unit 522, configured to transmit a contact notification message to a second application by using the first application, the contact notification message carrying an identifier of the any virtual item; and an item processing unit 523, configured to receive the contact notification message by using the second application, remove the any virtual item from the interactive interface based on the identifier of the any virtual item, and update the total quantity of acquired virtual items.

Optionally, referring to FIG. 6, the virtual item is a virtual resource packet, and at least one virtual resource packet includes a virtual resource; and the item acquisition module 502 includes:

a resource delivering unit 524, configured to deliver, in response to any virtual resource packet meeting the virtual element, a virtual resource in the virtual resource packet to a resource account of a user identification currently logged in.

When the virtual item interaction apparatus provided in the foregoing embodiments performs virtual item interaction, only a division of the foregoing functional modules is used for description. In actual application, the functions may be allocated to and completed by different functional modules as required, that is, the internal structure of the computer device is divided into different functional modules, to implement all or some of the functions described above. In addition, the virtual item interaction apparatus provided in the foregoing embodiments and the embodiments of the virtual item interaction method belong to one concept. For a specific implementation process, reference can be made to the method embodiments, and details are not described herein again.

Figure 7:
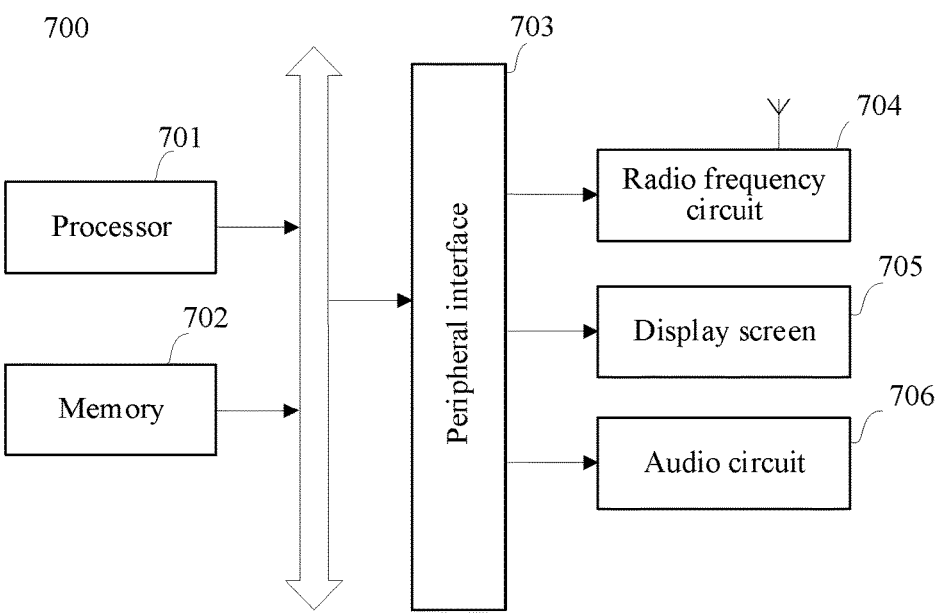
FIG. 7 is a schematic structural diagram of an exemplary terminal according to an embodiment of this disclosure.

FIG. 7 is a schematic structural diagram of a terminal according to an embodiment of this disclosure, which can implement the virtual item interaction method in the foregoing embodiments. Optionally, the terminal 700 is a portable mobile terminal, for example: a smartphone, a tablet computer, a Moving Picture Experts Group Audio Layer III (MP3) player, a Moving Picture Experts Group Audio Layer IV (MP4) player, a notebook computer, a desktop computer, a head-mounted device, a smart TV, a smart speaker, a smart remote, a smart microphone, or any another smart terminal. The terminal 700 may also be referred to as user equipment, a portable terminal, a laptop terminal, or a desktop terminal, or another name.

Generally, the terminal 700 includes a processor 701 and a memory 702.

The processor 701 may include one or more processing cores, for example, a 4-core processor or an 8-core processor. The memory 702 may include one or more computer-readable storage media, the computer-readable storage media being non-transitory and being configured to store at least one computer program, and the at least one computer program being configured to be executed by the processor 701 to implement the virtual item interaction method provided in the method embodiments of this disclosure.

In some embodiments, the terminal 700 may optionally include a peripheral interface 703 and at least one peripheral. The processor 701, the memory 702, and the peripheral interface 703 may be connected by a bus or a signal line. Each peripheral may be connected to the peripheral interface 703 by using a bus, a signal cable, or a circuit board. Optionally, the peripheral device includes: at least one of a radio frequency (RF) circuit 704, a display screen 705, and an audio circuit 706.

The RF circuit 704 is configured to receive and transmit an RF signal, also referred to as an electromagnetic signal. The RF circuit 704 communicates with a communication network and another communication device by using the electromagnetic signal.

The display screen 705 is configured to display a user interface (UI). The UI may include a graph, a text, an icon, a video, and any combination thereof. The display screen 705 may be a touch display screen, and may further be configured to provide virtual buttons and/or virtual keyboards.

The audio circuit 706 may include a microphone and a loudspeaker. The microphone is configured to acquire audio waves of the user and an environment, and convert the audio waves into electrical signals and input the electrical signals into the processor 701 for processing, or input the electrical signals into the RF circuit 704 to implement speech communication. For the purpose of stereo acquisition or noise reduction, there may be a plurality of microphones, respectively disposed at different portions of the terminal 700. The microphone may further be an array microphone or an omni-directional acquisition type microphone. The loudspeaker is configured to convert electric signals from the processor 701 or the radio frequency circuit 704 into audio waves.

Figure 8:
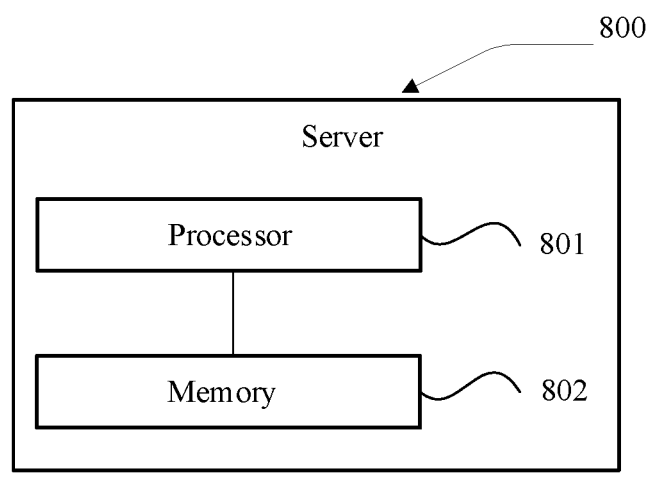
FIG. 8 is a schematic structural diagram of an exemplary server according to an embodiment of this disclosure.

A person skilled in the art may understand that the structure shown in FIG. 7 does not constitute a limitation to the terminal 700, and the terminal may include more components or fewer components than those shown in the figure, or some components may be combined, or a different component deployment may be used FIG. 8 is a schematic structural diagram of a server according to an embodiment of this disclosure. The server 800 may vary greatly due to different configurations or performance, and may include one or more processors (such as CPUs) 801 and one or more memories 802. The memory 802 stores at least one computer program, the at least one computer program being loaded and executed by the processor 801 to implement the methods provided in the foregoing method embodiments. Certainly, the server may also have a wired or wireless network interface, a keyboard, an input/output interface and other components to facilitate input/output. The server may also include other components for implementing device functions. Details are not described herein again.

The server 800 is configured to perform the foregoing virtual item interaction method.

An embodiment of this disclosure further provides a computer device. The computer device includes a processor and a memory, the memory storing at least one computer program, the computer program being loaded and executed by the processor to implement the following operations in the virtual item interaction method:

displaying a virtual element and a captured image by using an interactive interface, the virtual element overlapping a reference body part of a target object in the image;

displaying a movement animation of at least one virtual item; and in response to any virtual item meeting the virtual element, acquiring the any virtual item.

Optionally, the at least one computer program is further loaded and executed by the processor to implement the following operations:

displaying the captured image by using the interactive interface; and displaying the virtual element based on a position of the reference body part in the interactive interface.

Optionally, the at least one computer program is further loaded and executed by the processor to implement the following operations:

in response to a change in the position of the reference body part in the interactive interface, displaying the virtual element based on the changed position of the reference body part, so that the virtual element and the reference body part keep overlapping.

Optionally, the at least one computer program is further loaded and executed by the processor to implement the following operations:

displaying animations of a plurality of virtual items moving in a target direction.

Optionally, a distance between any two adjacent virtual items in the target direction in the plurality of virtual items is a target distance; or, an interval between display time periods of any two adjacent virtual items in the plurality of virtual items is a target duration.

Optionally, the at least one computer program is further loaded and executed by the processor to implement the following operations:

acquiring a distance between any two adjacent virtual items in the target direction in the plurality of virtual items; and displaying the animations of the plurality of virtual items moving in the target direction based on the acquired distance.

Optionally, the at least one computer program is further loaded and executed by the processor to implement the following operations:

acquiring a random value based on a target value range for the any two virtual items; and determining a product of an initial distance and the random value as the distance between the any two virtual items in the target direction.

Optionally, the at least one computer program is further loaded and executed by the processor to implement the following operations:

displaying animations of the plurality of virtual items respectively moving in a plurality of channels, a direction of the plurality of channels being the target direction; or, displaying animations of the plurality of virtual items respectively moving along a plurality of baselines, a direction of the plurality of baselines being the target direction.

Optionally, the at least one computer program is further loaded and executed by the processor to implement the following operations:

determining the plurality of channels in the interactive interface; and for any one of the plurality of virtual items, randomly determining any channel from the plurality of channels, and displaying an animation of the any virtual item moving in the any channel.

Optionally, the at least one computer program is further loaded and executed by the processor to implement the following operations:

dividing the interactive interface into the plurality of channels based on a width of the interactive interface, a width of each channel being greater than a width of the virtual item.

Optionally, the at least one computer program is further loaded and executed by the processor to implement the following operations:

determining the plurality of baselines in the interactive interface; and for any one of the plurality of virtual items, randomly determining any baseline from the plurality of baselines, and displaying an animation of the any virtual item moving along the any baseline.

Optionally, the virtual item is a virtual resource packet, and at least one virtual resource packet includes a virtual resource; and the at least one computer program is further loaded and executed by the processor to implement the following operations:

in response to any virtual resource packet meeting the virtual element, delivering a virtual resource in the virtual resource packet to a resource account of a user identification currently logged in.

An embodiment of this disclosure further provides a non-transitory computer-readable storage medium, storing at least one computer program, the at least one computer program being loaded and executed by a processor to implement the following operations in the virtual item interaction method:

displaying a virtual element and a captured image by using an interactive interface, the virtual element overlapping a reference body part of a target object in the image;

displaying a movement animation of at least one virtual item; and in response to any virtual item meeting the virtual element, acquiring the any virtual item.

Optionally, the at least one computer program is further loaded and executed by the processor to implement the following operations:

displaying the captured image by using the interactive interface; and displaying the virtual element based on a position of the reference body part in the interactive interface.

Optionally, the at least one computer program is further loaded and executed by the processor to implement the following operations:

in response to a change in the position of the reference body part in the interactive interface, displaying the virtual element based on the changed position of the reference body part, so that the virtual element and the reference body part keep overlapping.

Optionally, the at least one computer program is further loaded and executed by the processor to implement the following operations:

displaying animations of a plurality of virtual items moving in a target direction.

Optionally, a distance between any two adjacent virtual items in the target direction in the plurality of virtual items is a target distance; or, an interval between display time periods of any two adjacent virtual items in the plurality of virtual items is a target duration.

Optionally, the at least one computer program is further loaded and executed by the processor to implement the following operations:

acquiring a distance between any two adjacent virtual items in the target direction in the plurality of virtual items; and displaying the animations of the plurality of virtual items moving in the target direction based on the acquired distance.

Optionally, the at least one computer program is further loaded and executed by the processor to implement the following operations:

acquiring a random value based on a target value range for the any two virtual items; and determining a product of an initial distance and the random value as the distance between the any two virtual items in the target direction.

Optionally, the at least one computer program is further loaded and executed by the processor to implement the following operations:

displaying animations of the plurality of virtual items respectively moving in a plurality of channels, a direction of the plurality of channels being the target direction; or, displaying animations of the plurality of virtual items respectively moving along a plurality of baselines, a direction of the plurality of baselines being the target direction.

Optionally, the at least one computer program is further loaded and executed by the processor to implement the following operations:

determining the plurality of channels in the interactive interface; and for any one of the plurality of virtual items, randomly determining any channel from the plurality of channels, and displaying an animation of the any virtual item moving in the any channel.

Optionally, the at least one computer program is further loaded and executed by the processor to implement the following operations:

dividing the interactive interface into the plurality of channels based on a width of the interactive interface, a width of each channel being greater than a width of the virtual item.

Optionally, the at least one computer program is further loaded and executed by the processor to implement the following operations:

determining the plurality of baselines in the interactive interface; and for any one of the plurality of virtual items, randomly determining any baseline from the plurality of baselines, and displaying an animation of the any virtual item moving along the any baseline.

Optionally, the virtual item is a virtual resource packet, and at least one virtual resource packet includes a virtual resource; and the at least one computer program is further loaded and executed by the processor to implement the following operations:

in response to any virtual resource packet meeting the virtual element, delivering a virtual resource in the virtual resource packet to a resource account of a user identification currently logged in.

An embodiment of this disclosure further provides a computer program product or a computer program, the computer program product or the computer program including computer program code, the computer program code being stored in a non-transitory computer-readable storage medium, a processor of a computer device reading the computer instructions from the non-transitory computer-readable storage medium, and the processor executing the computer program code to cause the computer device to implement the following operations in the virtual item interaction method:

displaying a virtual element and a captured image by using an interactive interface, the virtual element overlapping a reference body part of a target object in the image;

displaying a movement animation of at least one virtual item; and in response to any virtual item meeting the virtual element, acquiring the any virtual item.

Optionally, the at least one computer program code is further loaded and executed by the processor to implement the following operations:

displaying the captured image by using the interactive interface; and displaying the virtual element based on a position of the reference body part in the interactive interface.

Optionally, the at least one computer program code is further loaded and executed by the processor to implement the following operations:

in response to a change in the position of the reference body part in the interactive interface, displaying the virtual element based on the changed position of the reference body part, so that the virtual element and the reference body part keep overlapping.

Optionally, the at least one computer program code is further loaded and executed by the processor to implement the following operations:

displaying animations of a plurality of virtual items moving in a target direction.

Optionally, a distance between any two adjacent virtual items in the target direction in the plurality of virtual items is a target distance; or, an interval between display time periods of any two adjacent virtual items in the plurality of virtual items is a target duration.

Optionally, the at least one computer program code is further loaded and executed by the processor to implement the following operations:
  acquiring a distance between any two adjacent virtual items in the target direction in the plurality of virtual items; and
  displaying the animations of the plurality of virtual items moving in the target direction based on the acquired distance.

Optionally, the at least one computer program code is further loaded and executed by the processor to implement the following operations:
  acquiring a random value based on a target value range for the any two virtual items; and
  determining a product of an initial distance and the random value as the distance between the any two virtual items in the target direction.

Optionally, the at least one computer program code is further loaded and executed by the processor to implement the following operations:
  displaying animations of the plurality of virtual items respectively moving in a plurality of channels, a direction of the plurality of channels being the target direction; or,
  displaying animations of the plurality of virtual items respectively moving along a plurality of baselines, a direction of the plurality of baselines being the target direction.

Optionally, the at least one computer program code is further loaded and executed by the processor to implement the following operations:
  determining the plurality of channels in the interactive interface; and
  for any one of the plurality of virtual items, randomly determining any channel from the plurality of channels, and displaying an animation of the any virtual item moving in the any channel.

Optionally, the at least one computer program code is further loaded and executed by the processor to implement the following operations:
  dividing the interactive interface into the plurality of channels based on a width of the interactive interface, a width of each channel being greater than a width of the virtual item.

Optionally, the at least one computer program code is further loaded and executed by the processor to implement the following operations:
  determining the plurality of baselines in the interactive interface; and
  for any one of the plurality of virtual items, randomly determining any baseline from the plurality of baselines, and displaying an animation of the any virtual item moving along the any baseline.

Optionally, the virtual item is a virtual resource packet, and at least one virtual resource packet includes a virtual resource; and the at least one computer program code is further loaded and executed by the processor to implement the following operations:
  in response to any virtual resource packet meeting the virtual element, delivering a virtual resource in the virtual resource packet to a resource account of a user identification currently logged in.

A person of ordinary skill in the art may understand that all or some of the steps of the foregoing embodiments may be implemented by hardware, or may be implemented by a program instructing relevant hardware. The program may be stored in a non-transitory computer-readable storage medium. The non-transitory storage medium may be a read-only memory, a magnetic disk, an optical disc, etc.

The foregoing descriptions are merely exemplary embodiments, and are not intended to limit the embodiments of this disclosure. Any modification, equivalent replacement, or improvement made within the spirit and principle of the embodiments of this disclosure shall fall within the protection scope of this application.

What is claimed is:

1. A virtual item interaction method, applicable to a computer device, the method comprising:
  displaying a virtual element and an image of a player captured by using an interactive interface, the virtual element touching a reference body part of the player in the image;
  in response to the player moving relative to the interactive interface, displaying a corresponding movement of the reference body part as well as a corresponding movement of the virtual element in the image such that the virtual element still touches the reference body part;
  displaying an animation of at least one virtual item; and
  in response to any of the at least one virtual item touching the virtual element, capturing the any of the at least one virtual item.

2. The method according to claim 1, wherein displaying the virtual element and the image captured by using the interactive interface comprises:
  displaying the image by using the interactive interface; and
  displaying the virtual element in the interactive interface based on a position of the reference body part.

3. The method according to claim 1, wherein after displaying the virtual element and the image captured by using the interactive interface, the method further comprises:
  in response to a change of position of the reference body part in the interactive interface, displaying the virtual element based on the changed position of the reference body part, so that the virtual element and the reference body part keep touching each other.

4. The method according to claim 1, wherein displaying the animation of at least one virtual item comprises:
  displaying the animation of the at least one virtual item moving in a target direction.

5. The method according to claim 4, wherein a distance along the target direction between any two adjacent virtual items in the at least one virtual item is a target distance; or
  an interval between display time periods of any two adjacent virtual items in the at least one virtual item is a target duration.

6. The method according to claim 4, wherein displaying the animation of the at least one virtual item moving in a target direction comprises:
  acquiring a distance along the target direction between any two adjacent virtual items in the at least one virtual item; and
  displaying the animation of the at least one virtual item moving in the target direction based on the acquired distance.

7. The method according to claim 6, wherein acquiring the distance along the target direction between the any two adjacent virtual items in the at least one virtual item comprises:
  acquiring a random value based on a target value range for the any two adjacent virtual items; and determining a product of an initial distance along the target direction between the any two adjacent virtual items and the random value as the distance between the any two adjacent virtual items along the target direction.

8. The method according to claim 4, wherein displaying the animation of of the at least one virtual item moving in the target direction comprises:
displaying the animation of each of the at least one virtual item moving in a corresponding channel, a direction of the corresponding channel being the target direction; or
displaying the animation of the each of the at least one virtual item moving along a corresponding baseline, a direction of the corresponding baseline being the target direction.

9. The method according to claim 8, wherein displaying the animation of the each of the at least one virtual item moving in the corresponding channel comprises:
determining a plurality of channels in the interactive interface; and
for the each of the at least one virtual item, randomly selecting a channel from the plurality of channels, and displaying the animation of the each of the at least one virtual item moving in the selected channel.

10. The method according to claim 9, wherein determining the plurality of channels in the interactive interface comprises:
dividing the interactive interface into the plurality of channels based on a width of the interactive interface, a width of each channel being greater than a width of the virtual item.

11. The method according to claim 8, wherein displaying the animation of the each of the at least one virtual item moving along a corresponding baseline comprises:
determining a plurality of baselines in the interactive interface; and
for the each of the at least one virtual item, randomly selecting a baseline from the plurality of baselines, and displaying the animation of the each of the at least one virtual item moving along the selected baseline.

12. The method according to claim 1, wherein each of the at least one virtual item is a packet comprising a virtual resource, and in response to the any of the at least one virtual item touching the virtual element, capturing the any of the at least one virtual item comprises:
in response to any packet touching the virtual element, delivering the virtual resource in the packet to a resource account of a user currently logged in.

13. A device comprising a memory for storing computer instructions and a processor in communication with the memory, wherein, when the processor executes the computer instructions, the processor is configured to cause the device to:
display a virtual element and an image of a player captured by using an interactive interface, the virtual element touching a reference body part of the player in the image;
in response to the player moving relative to the interactive interface, display a corresponding movement of the reference body part as well as a corresponding movement of the virtual element in the image such that the virtual element still touches the reference body part;
display an animation of at least one virtual item; and
in response to any of the at least one virtual item touching the virtual element, capture the any of the at least one virtual item.

14. The device according to claim 13, wherein, when the processor is configured to cause the device to display the virtual element and the image captured by using the interactive interface, the processor is configured to cause the device to:
display the image by using the interactive interface; and
display the virtual element in the interactive interface based on a position of the reference body part.

15. The device according to claim 13, wherein, after the processor is configured to cause the device to display the virtual element and the image captured by using the interactive interface, the processor is configured to further cause the device to:
in response to a change of position of the reference body part in the interactive interface, display the virtual element based on the changed position of the reference body part, so that the virtual element and the reference body part keep touching each other.

16. The device according to claim 13, wherein, when the processor is configured to cause the device to display the animation of at least one virtual item, the processor is configured to cause the device to:
display the animation of the at least one virtual item moving in a target direction.

17. The device according to claim 16, wherein a distance along the target direction between any two adjacent virtual items in the at least one virtual item is a target distance; or
an interval between display time periods of any two adjacent virtual items in the at least one virtual item is a target duration.

18. The device according to claim 16, wherein, when the processor is configured to cause the device to display the animation of the at least one virtual item moving in a target direction, the processor is configured to cause the device to:
acquire a distance along the target direction between any two adjacent virtual items in the at least one virtual item; and
display the animation of the at least one virtual item moving in the target direction based on the acquired distance.

19. A non-transitory storage medium for storing computer readable instructions, the computer readable instructions, when executed by a processor, causing the processor to:
display a virtual element and an image of a player captured by using an interactive interface, the virtual element touching a reference body part of the player in the image;
in response to the player moving relative to the interactive interface, display a corresponding movement of the reference body part as well as a corresponding movement of the virtual element in the image such that the virtual element still touches the reference body part;
display an animation of at least one virtual item; and
in response to any of the at least one virtual item touching the virtual element, capture the any of the at least one virtual item.

20. The non-transitory storage medium according to claim 19, wherein, when the computer readable instructions cause the processor to display the virtual element and the image captured by using the interactive interface, the computer readable instructions cause the processor to:
display the image by using the interactive interface; and
display the virtual element in the interactive interface based on a position of the reference body part.

* * * * *